Oct. 6, 1959  J. W. O'NEIL  2,907,206
IRRIGATION GAUGE
Filed April 16, 1956
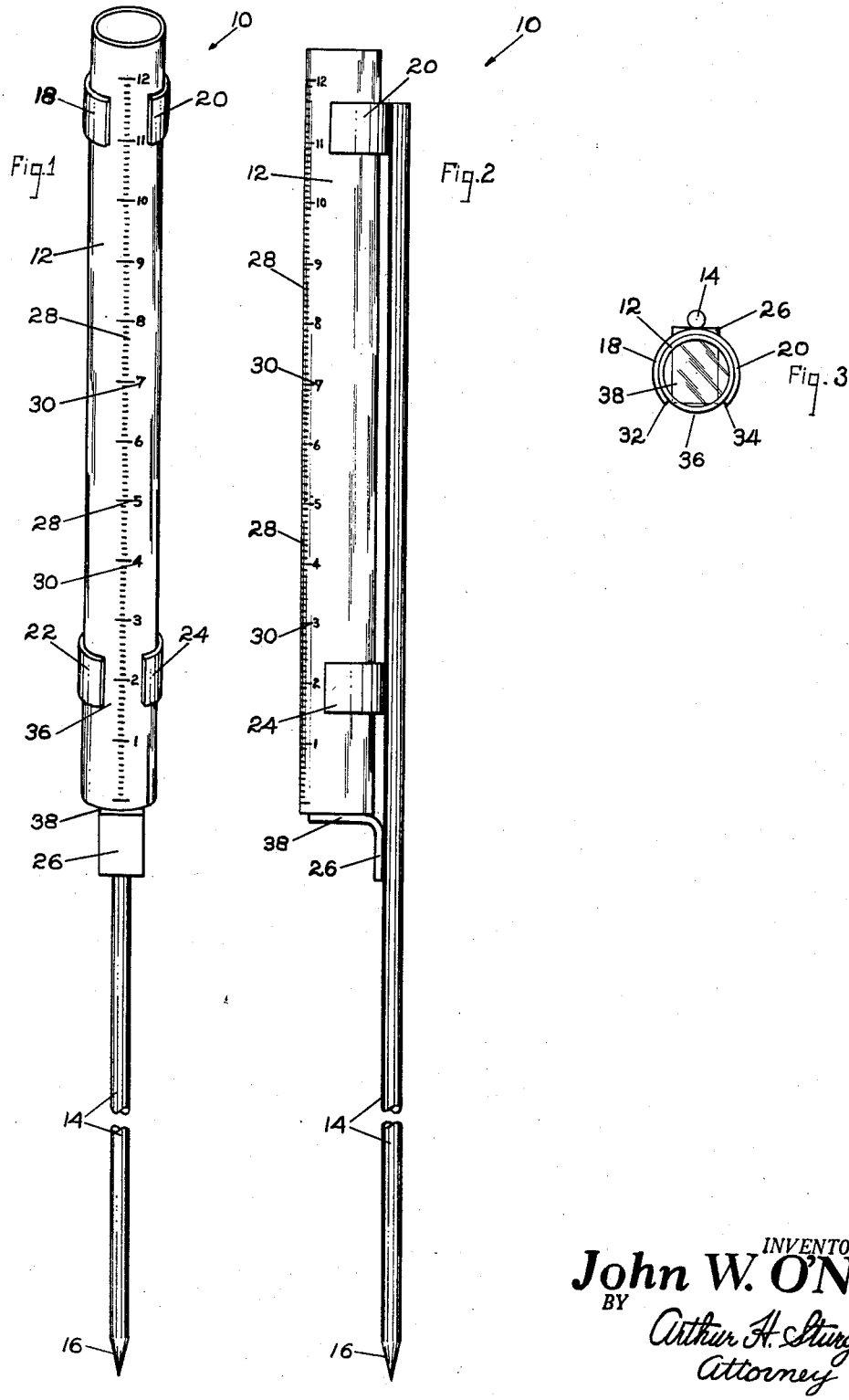
INVENTOR
John W. O'Neil
BY
Arthur H. Sturges,
Attorney

United States Patent Office 2,907,206
Patented Oct. 6, 1959

2,907,206

IRRIGATION GAUGE

John W. O'Neil, Wauneta, Nebr.

Application April 16, 1956, Serial No. 578,457

3 Claims. (Cl. 73—171)

This invention relates to irrigation and particularly irrigation of farm lands by sprinklers and the like, and in particular a graduated transparent tube and a supporting bracket therefor, whereby with a point on the lower end of the bracket positioned in the ground the tube, the upper end of which is open, is supported in an upright position and the amount of water sprayed by the sprinklers is caught in the tube and readily measured by the graduations thereof.

The purpose of this invention is to determine the quantity of water sprayed over a parcel of ground so that the spraying means may be moved from place to place in order that an entire field, or the like, may be sprayed with the same amount of water.

In irrigating farm land with sprinklers and the like it is difficult to ascertain the quantity of water sprayed over a section of the land, so that sprinklers are moved from one position to another when the soil looks wet or by guess, and consequently, some sections of land receive too much water and others do not receive a sufficient quantity.

With this thought in mind this invention contemplates a tube for catching water sprayed from sprinklers and the like wherein the amount of water caught in the tube is equivalent to the amount received by the soil, so that by checking the water in the tube the amount of water sprayed on the soil is readily ascertained.

The object of this invention is, therefore, to provide a receptacle adapted to be positioned on the ground so that an amount of water sprayed on the ground is equivalent to the amount received by the receptacle.

Another object of the invention is to provide a device for measuring the quantity of water sprayed over the ground in which the device may be moved from one location to another.

Another important object of the invention is to provide a gauge for measuring the quantity of water sprayed over the ground in which the quantity of water indicated by the gauge may be read without moving the gauge.

A further object of the invention is to provide a gauge for readily ascertaining the amount of water sprayed over the ground in which the gauge is relatively small so that a farmer may carry a quantity of the gauges in laying out an area to be sprinkled.

A still further object of the invention is to provide a gauge for determining the quantity of water sprayed over an area of ground in which the gauge is substantially indestructible so that it may be stored and used from year to year.

And a still further object is to provide a gauge for ascertaining the quantity of water sprayed upon the ground in which the gauge is of a simple and economical construction.

With these and other objects and advantages in view the invention embodies a tube of transparent material, closed at the lower end and having an open upper end, and a rod having arcuate spring fingers extended from one side and positioned to receive the tube, the rod having a pointed lower end, to facilitate forcing the rod into the soil, and an L-shaped clip extended from the side from which the spring fingers extend and positioned to provide a rest for the tube, and said tube having graduations indicating units of measure thereon.

Other features and advantages of the invention will appear from the following description taken in connection with the drawings, wherein:

Figure 1 is a front elevational view of the improved water measuring gauge with part of the lower portion of the rod broken away.

Figure 2 is a side elevational view of the gauge also with part of the rod broken away.

Figure 3 is a plan view of the gauge.

While one embodiment of the invention is illustrated in the above-referred-to drawings, it is to be understood that it is merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a transparent tube, numeral 14, a rod having a point 16 on the lower end, spaced spring fingers 18 and 20 extended from the upper end, similar spring fingers 22 and 24 extended from the intermediate part, and a clip angle 26 spaced downwardly from the fingers 22 and 24.

The tube 12 is provided with graduations 28 which are numbered from the lower end with numerals 30 indicating units of measure, and as water is caught in the tube the number of inches of water therein is readily ascertained.

The spring fingers are secured to the rod 14 by suitable means, such as by welding, and with the ends of the fingers terminating at the points 32 and 34, as shown in Figure 3, the graduations and numerals may be observed through the gaps 36 between the ends of the fingers. The clip angle 26 is secured to the rod, also by welding or the like, and a horizontal arm 33 thereof is positioned to provide a stop or rest for the tube 12.

Operation

With the parts assembled as illustrated and described the gauges are carried to a section of land and the points of the rods are pressed into the soil with the tubes extended upwardly, and with one or a plurality of the tubes in position, sprinklers, or the like are turned on, and as water is sprayed upon the ground an amount of water, equal to that sprayed upon the ground is received in the tubes. By reading the numerals the quantity, or number of inches of water sprayed upon the ground is readily determined.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A gauge comprising an elongated rod having a point on the lower end, vertically spaced pairs of spring fingers and a rest extended from one side of the rod, and a tube of transparent material retained in said spring fingers and positioned on said rest, the lower end of said tube being closed and the upper end open.

2. In a gauge for ascertaining the quantity of water sprayed upon farm land, the combination which comprises an elongated rod having a point on the lower end, vertically spaced spring fingers on the upper portion and extended from one side, a clip angle secured to the rod and spaced downwardly from the lowermost of said spring fingers, said clip angle and spring fingers being in alignment, and a transparent tube having graduations on one side with equal numbers of said graduations numbered to designate units of measure, positioned in said spring fingers and resting upon said clip angle, the lower end of the tube being closed and the upper end open and the ends of the spring fingers terminating at spaced points providing gaps to facilitate reading the numbers of the graduations.

3. A gauge comprising a rod having a point on the lower end and vertically spaced spring clips on one side, and a tube of transparent material, closed at the lower end and positioned in said spring clips.

References Cited in the file of this patent

UNITED STATES PATENTS

| | | |
|---|---|---|
| 756,109 | Friez | Mar. 29, 1904 |
| 2,381,602 | Larson | Aug. 7, 1945 |
| 2,509,522 | Phillips | May 30, 1950 |
| 2,513,605 | Vernon | July 4, 1950 |